(12) United States Patent
Janson

(10) Patent No.: US 8,641,574 B2
(45) Date of Patent: Feb. 4, 2014

(54) TRANSFER SHAFT SUPPORT

(75) Inventor: David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 13/052,387

(22) Filed: Mar. 21, 2011

(65) Prior Publication Data

US 2012/0220417 A1   Aug. 30, 2012

Related U.S. Application Data

(63) Continuation-in-part of application No. 13/033,814, filed on Feb. 24, 2011.

(51) Int. Cl.
*F16H 48/06*   (2006.01)

(52) U.S. Cl.
USPC ............................................. 475/220; 74/650

(58) Field of Classification Search
USPC ......... 475/206, 220, 221, 225, 230, 246, 248, 475/253, 331, 348; 74/650
See application file for complete search history.

(56) References Cited

U.S. PATENT DOCUMENTS

| | | | | |
|---|---|---|---|---|
| 4,730,517 A | * | 3/1988 | Hamano et al. | 475/304 |
| 4,736,652 A | * | 4/1988 | Shimamoto | 74/665 GE |
| 5,226,339 A | * | 7/1993 | Donato et al. | 74/375 |
| 6,719,660 B2 | * | 4/2004 | Palazzolo | 475/221 |
| 2002/0055408 A1 | * | 5/2002 | Shimizu | 475/216 |
| 2006/0068963 A1 | * | 3/2006 | Sugano et al. | 475/206 |

* cited by examiner

*Primary Examiner* — Justin Holmes
(74) *Attorney, Agent, or Firm* — James Dottavio; MacMillan, Sobanski & Todd, LLC

(57) ABSTRACT

A drive assembly for a vehicle includes a shaft supported on first and second components, a gear wheel for transmitting torque, and a bearing supporting the gear wheel on the shaft, transmitting axial force in a first axial direction between the gear wheel and the first component, and transmitting axial force in a second direction opposite the first direction between the gear wheel and the second component.

19 Claims, 8 Drawing Sheets

TRANSFER SHAFT SUPPORT

This application is a continuation-in-part of pending U.S. application Ser. No. 13/033,814, filed Feb. 24, 2011.

BACKGROUND OF THE INVENTION

1. Field of the Invention

This invention relates to an automatic transmission for a motor vehicle that includes planetary gearsets and clutches and brakes state of engagement and disengagement determines operative speed ratios produced by the transmission.

2. Description of the Prior Art

In a front wheel drive vehicle, the axial space available for the transmission is limited by the width of the engine compartment and the length of the engine. In addition, the trend to increase the number of ratios available generally increases the number of components required. For these reasons, it is desirable to position components concentrically in order to minimize axial length. The ability to position components concentrically is limited, however, by the need to connect particular components mutually and to the transmission case.

Furthermore, it is desirable for the output element to be located near the center of the vehicle, which corresponds to the input end of the gear box. An output element located toward the outside of the vehicle may require additional support structure and add length on the transfer axis. With some kinematic arrangements, however, the need to connect certain elements to the transmission case requires that the output element be so located.

A transmission requires a compact transfer shaft support design. A need exists for a transfer gear assembly, which requires no bearing support for the transfer shaft, and a ball bearing, rather than thrust bearings, to react thrust forces in both axial directions. The transfer gear teeth are preferably helical teeth.

SUMMARY OF THE INVENTION

A drive assembly for a vehicle includes a shaft supported on first and second components, a gear wheel for transmitting torque, and a bearing supporting the gear wheel on the shaft, transmitting axial force in a first axial direction between the gear wheel and the first component, and transmitting axial force in a second direction opposite the first direction between the gear wheel and the second component.

Rotating shaft support is usually used for transfer gearing in transaxles, but the non-rotating transfer shaft requires no bearing support.

The transmission transfer mechanism provides a compact transfer shaft support. A ball bearing reacts thrust forces in both axial directions, thereby avoiding need for thrust bearings to support the transfer gear, though it is formed with helical teeth.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
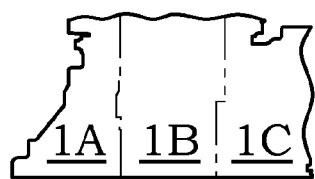
FIG. 1 is a cross sectional side view of a multiple speed automatic transaxle.
Figure 1A:
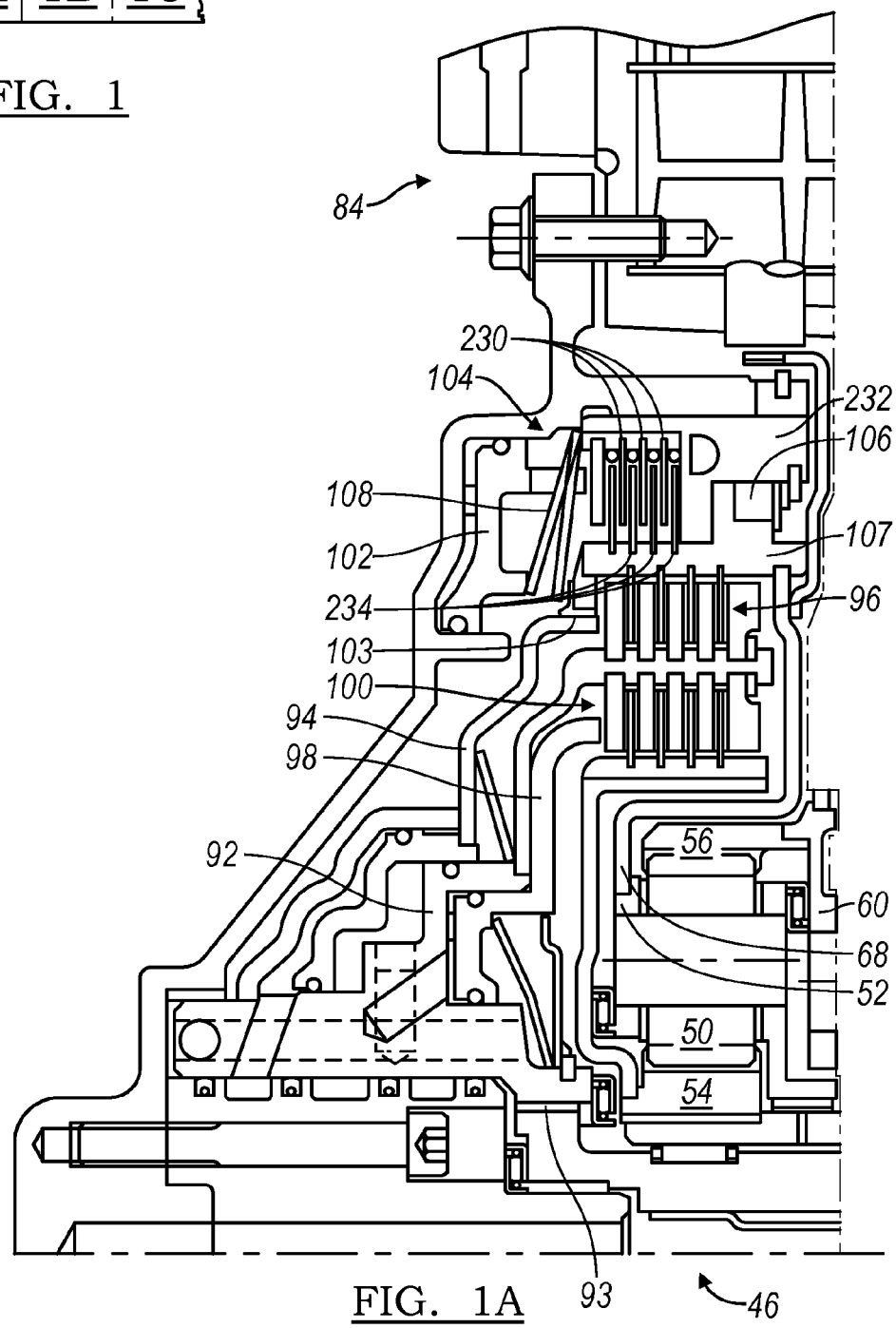
Figure 1B:
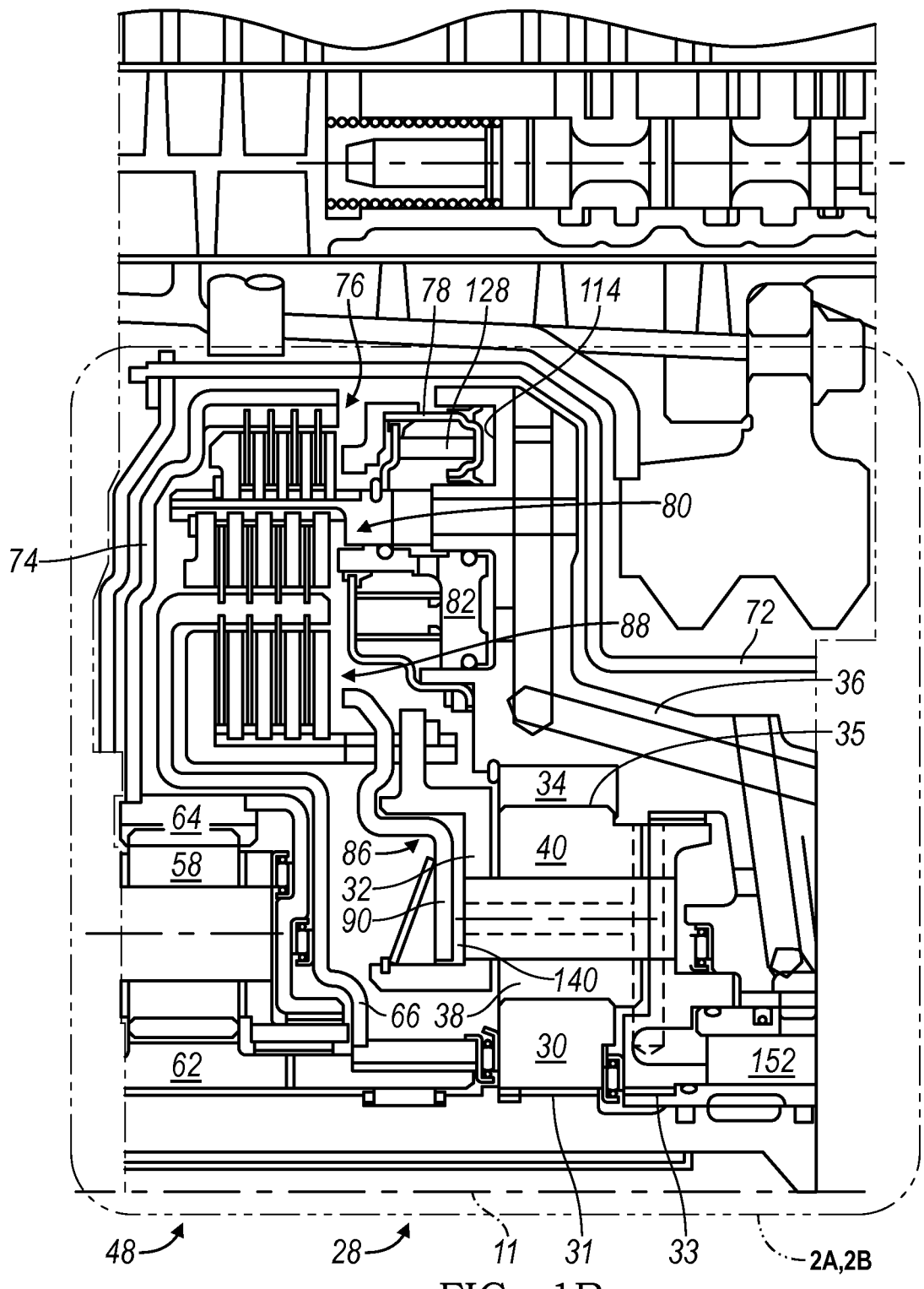
Figure 1C:
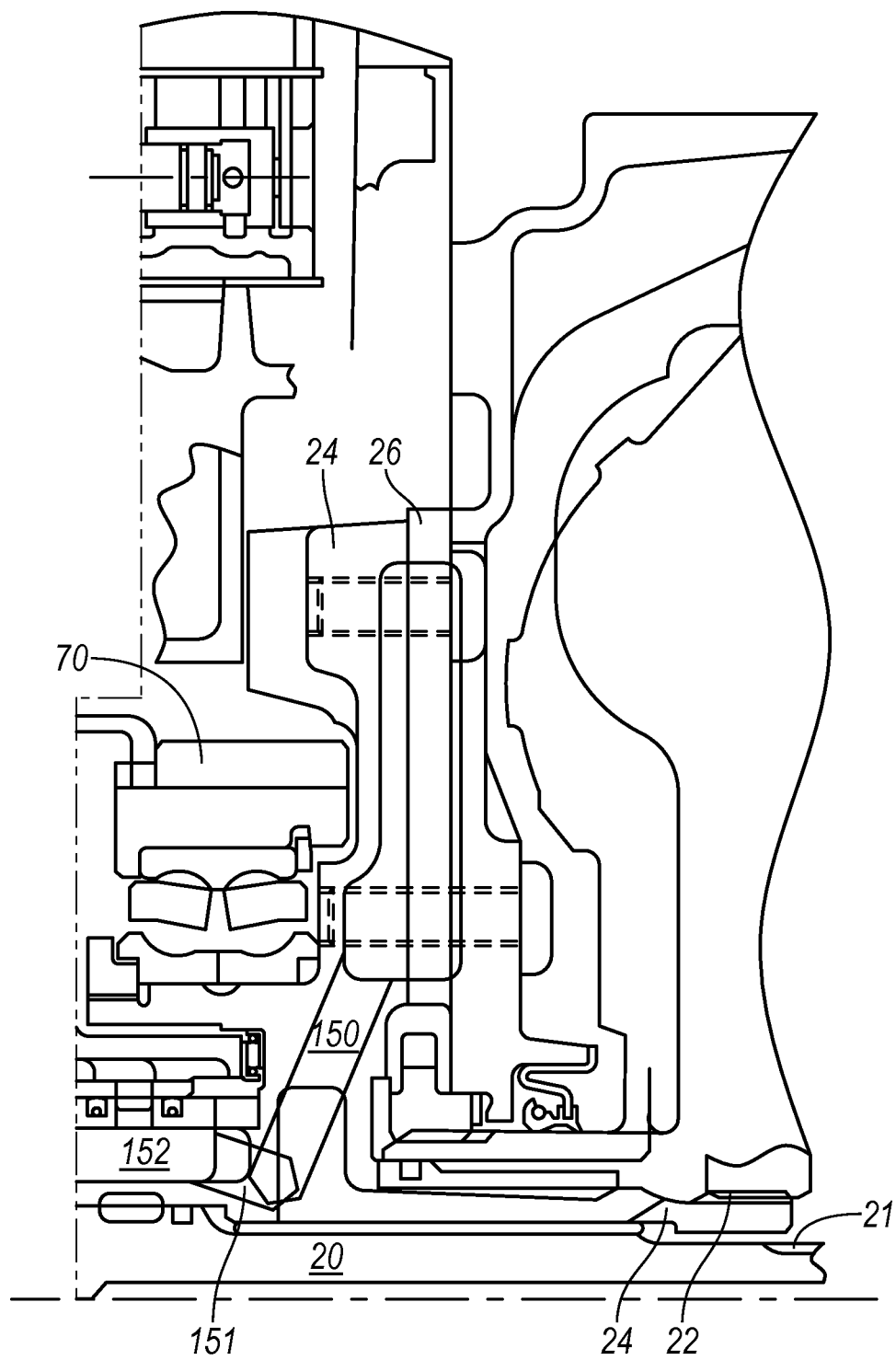

Referring now to the drawings, FIG. 1 illustrates gearing, clutches, brakes, shafts, fluid passages, and other components of a multiple-speed automatic transaxle 10 arranged substantially concentrically about an axis 11.

A torque converter includes an impeller driven by an engine, a turbine hydrokinetically coupled to the impeller, and a stator between the impeller and turbine. A transmission input shaft 20 is secured by a spline connection 21 to the turbine. The stator is secured by a spline connection 22 to a front support 24, which is secured against rotation to a transmission case 26.

A double pinion, speed reduction planetary gearset 28 includes a sun gear 30, secured by a spline connection 31 to input shaft 20; a carrier 32, secured by a spline connection 33 to the front support 24; a ring gear 34, secured by a spline connection 35 to a front cylinder assembly 36; a first set of planet pinions 38 supported on carrier 32 and meshing with sun gear 30; and a second set of planet pinions 40, supported on carrier 32 and meshing with ring gear 34 and the first pinions 38. Ring gear 34 rotates in the same direction as input shaft 20 but at a reduced speed.

Rear gearset 46 and middle gearset 48 are simple planetary gearsets. Gearset 46 includes a set of planet pinion 50 supported for rotation on carrier 52 and meshing with both sun gear 54 and ring gear 56. Gearset 48 includes a set of planet pinions 58 supported for rotation on carrier 60 and meshing with both sun gear 62 and ring gear 64. Sun gear 54 is splined to a shaft that is splined to a shell 66, on which shaft sun gear 62 is formed, thereby securing the sun gears 54, 62 mutually and to the shell 66. Carrier 52 is fixed to a shell 68. Carrier 60 and ring gear 56 are fixed to each other and to output pinion 70 through a shell 72. Ring gear 64 is fixed to shell 74.

Front cylinder assembly 36, which is fixed to ring gear 34, actuates clutches 76, 80. Plates for clutch 76 includes plates splined to front cylinder assembly 36 alternating with plates splined to shell 74. When hydraulic pressure is applied to piston 78, the plates are forced together and torque is transmitted between ring gears 34 and 64. When the hydraulic pressure is released, ring gears 34 and 64 may rotate at different speeds with low parasitic drag. Similarly, plates for clutch 80 include plates splined to front cylinder assembly 36 alternating with plates splined to shell 66. When hydraulic pressure is applied to piston 82, torque is transmitted between ring gear 34 and sun gears 54, 62. Pressurized fluid is routed from a control body 84, through front support 24, into front cylinder assembly 36 between rotating seals.

Middle cylinder assembly 86, which includes carrier 32, actuates brake 88. Plates for brake 88 include plates splined to carrier 32 alternating with plates splined to shell 66. When hydraulic pressure is applied to piston 90, the brake holds sun gears 54, 62 against rotation. Pressurized fluid is routed from the control body 84, through front support 24, between planet pinions 38, 40, into middle cylinder assembly 86. Due to the location of clutch pack 88, output element 70 is located in the more favorable position near the front of the gear box.

Rear cylinder assembly 92 is secured by a spline connection 93 fixed to input shaft 20. When hydraulic pressure is applied to piston 94, the plates of clutch 96 transmit torque between input shaft 20 and carrier 52. Similarly, when hydraulic pressure is applied to piston 98, the plates of clutch 100 transmit torque between input shaft 20 and sun gears 54, 62. Pressurized fluid is routed from the control body 84, into rear cylinder assembly 92.

When hydraulic pressure is applied to piston 102, brake 104 holds carrier 52 and shell 68 against rotation. A one-way clutch 106 passively prevents carrier 52 and shell 68 from rotating in the negative direction, but allows them to rotate in the forward direction. One-way clutch 106 may optionally be omitted and its function performed by actively controlling brake 104.

This arrangement permits brake 88 and clutches 76, 80 to be mutually concentric, located at an axial plane, and located radially outward from the planetary gearsets 28, 46, 48 such that they do not add to the axial length of the gearbox. Similarly, clutches 96, 100 and brake 104 are mutually concentric and located radially outward from the planetary gearing 28, 46, 48. Clutches 76, 80, 96, 100 and brakes 88, 104 comprise the control elements.

Figure 2A:
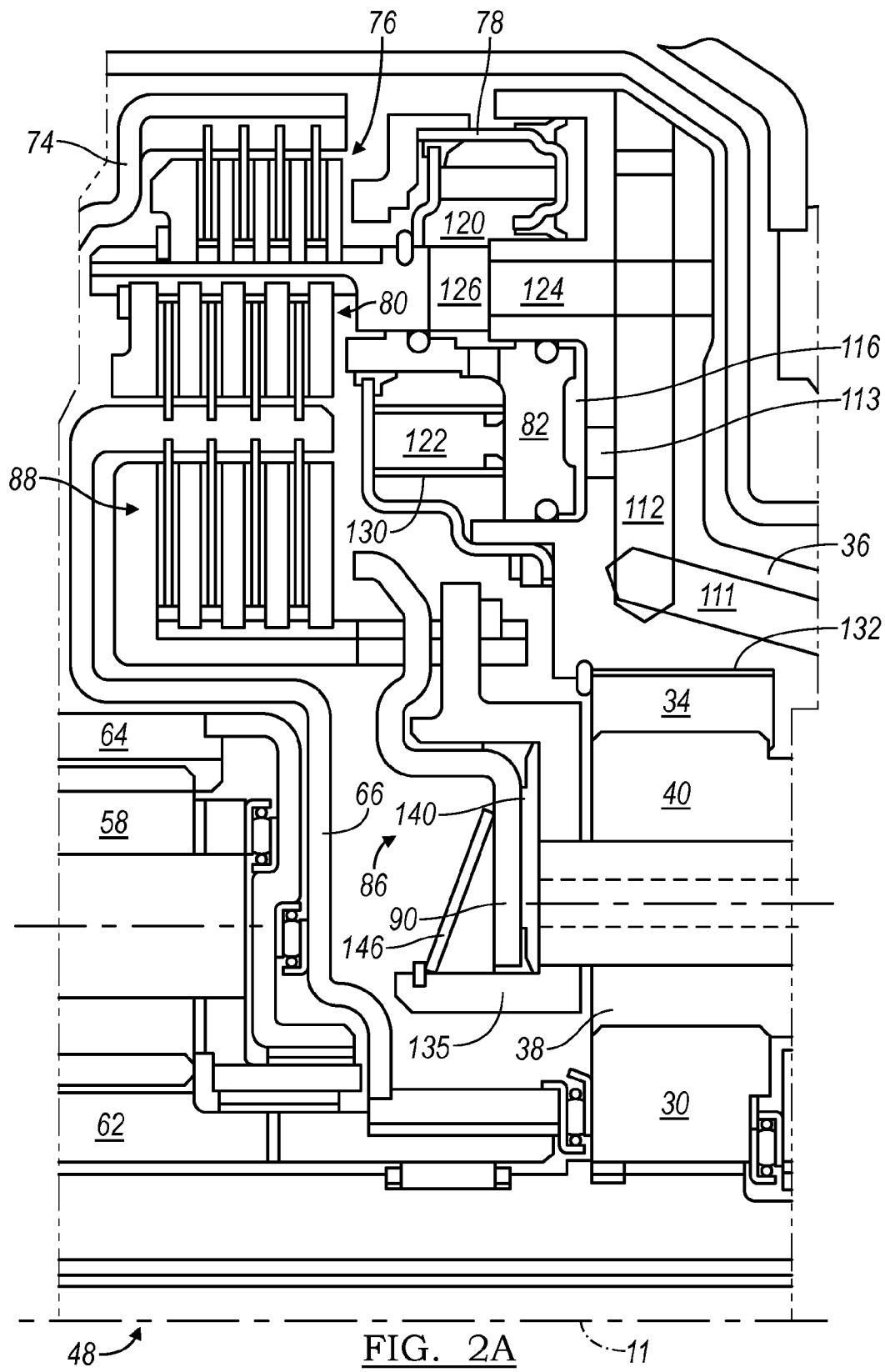
FIG. 2 is cross sectional side view of the transaxle showing the front and middle cylinder assemblies.
Figure 2B:
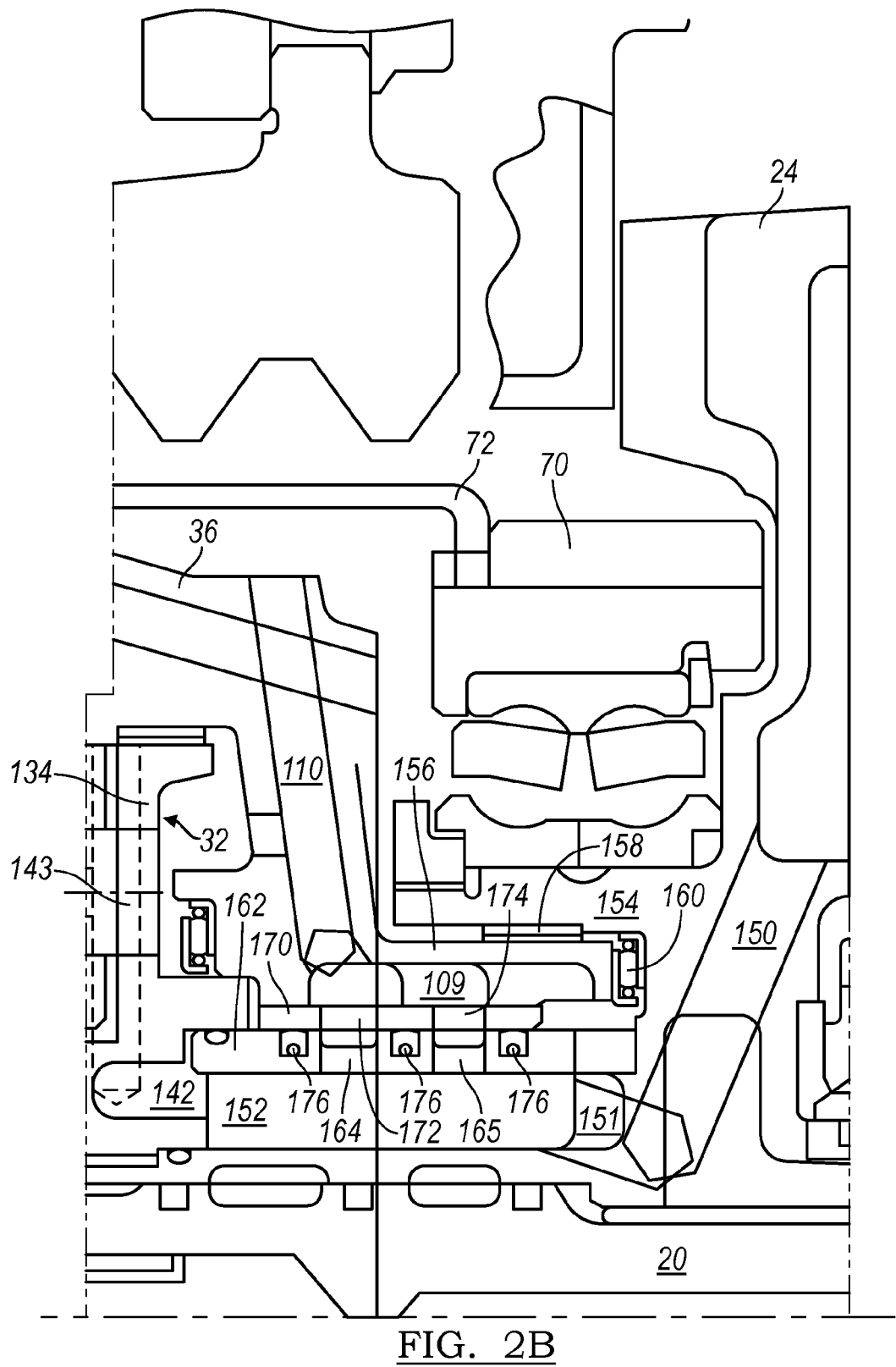

As FIG. 2 illustrates, the front cylinder assembly 36 is supported for rotation on the fixed front support 24 and carrier 34. The front cylinder assembly 36 is formed with clutch actuation fluid passages, each passage communicating with one of the cylinders 114, 116 formed in the front cylinder assembly 36. Cylinder 114 contains piston 78; cylinder 116 contains piston. One of the fluid passages in front cylinder assembly 36 is represented in FIG. 2 by interconnected passage lengths 109, 110, 111, 112, 113 through which cylinder 116 communicates with a source of clutch control hydraulic pressure. Cylinder 114 communicates with a source of clutch control hydraulic pressure through a passage similar to the fluid passage that comprises passage lengths 109, 110, 111, 112, 113. Passage lengths 109 are machined in the surface at the inside diameter of the front cylinder assembly 36.

The front cylinder assembly 36 is also formed with a passage that communicates with balance dams 120, 122. In FIG. 2 the balance dam supply passage is represented by interconnected passage lengths 110, 111, 112, axial passage length 124 and radial passage length 126, through which fluid flows into the balance dams 120, 122. Coiled compression springs 128, 130, each located in a respective balance dam 120, 122 urges the respective piston 78, 82 to the position shown in FIG. 2. Ring gear 34 is secured to front cylinder assembly 36 by a spline connection 132.

Middle cylinder assembly 86 includes carrier 32, which is grounded on the front support 24. Carrier 32 includes first and second plates 134, 135 and pinion shafts secured to the plates, one pinion shaft supporting pinions 38, and the other pinion shaft supporting pinions 40. Plate 135 is formed with a cylinder 140 containing a brake piston 90.

A source of brake actuating hydraulic pressure communicates with cylinder 140 through a series on interconnected passage lengths 142, 143 and a horizontal passage length that extends axially from passage 143, through a web of carrier 32, between the sets of planet pinions 38, 40, to cylinder 140. These brake feed passages are formed in carrier 32. When actuating pressure is applied to cylinder 140, piston 90 forces the plates of brake 88 into mutual frictional contact, thereby holding sun gears 54, 62 and shell 66 against rotation. A Belleville spring 146 returns piston 90 to the position shown in FIG. 2, when actuating pressure is vented from cylinder 140.

The front support 24 is formed with passages, preferably spaced mutually about axis 11. These passages in front support 24 are represented in the FIGS. 1 and 2 by passage lengths 150, 151, 152, through which hydraulic fluid is supplied to clutch servo cylinders 114, 116, brake servo cylinder 140, and balance dams 120, 122. A passage of each of the front support passages communicates hydraulic fluid and pressure to cylinders 114, 116 and balance dams 120, 122 of the front cylinder assembly 36 through the fluid passages 109, 110, 111, 112, 113, 124 formed in the front cylinder assembly 36. Another passage of each of the front support passages communicates hydraulic fluid and pressure to cylinder 140 of the middle cylinder assembly 86 through the fluid passages 142, 143 in carrier 32.

The front support 24 includes a bearing support shoulder 154, which extends axially and over an axial extension 156 of the front cylinder assembly 36. A bushing 158 and bearing 160 provide for rotation of the front cylinder assembly 36 relative to the front support 24. This arrangement of the front support 24, its bearing support shoulder 154, and front cylinder assembly 36, however, prevents radial access required to machine a passage or passages that would connect first passage 152 in front support 24 to the second passage 109 in the front cylinder assembly 36.

To overcome this problem and provide hydraulic continuity between passage lengths 109, 152, first passage 152 is formed with an opening that extends along a length of first passage 152, parallel to axis 11, and through an outer wall of the front support 24. The opening faces radially outward toward second passage 109. Similarly, second passage 109 is formed with a second opening that extends along a length of second passage 109, parallel to axis 11, and through an inner wall of the front cylinder assembly 36. The second opening faces radially inward toward first passage 152.

A first sleeve 162 is inserted axially with a press fit over a surface at an outer diameter of the front support 24, thereby covering the opening at the outer surface of passage length 152. Sleeve 162 is formed with radial passages 164, 165, which extend through the thickness of the sleeve 162. Seals 176, located at each side of the passages 164, 165 prevent leakage of fluid from the passages.

A second sleeve 170 is inserted axially with a press fit over the second opening at the inside diameter of the front cylinder assembly 36, thereby covering and enclosing the length of the second opening in the second passage 109. Sleeve 170 is formed with radial openings, two of which are represented in FIG. 2 by openings 172, 174, aligned with the radial passages 164, 165 formed in the first sleeve 162.

Sleeves 164 and 170 provides hydraulic continuity from the source of fluid pressure carried in the passages of the front support 24 to the balance dams 120, 122 and the servo cylinders 114, 116, 140, through which clutches 76, 80 and brake 88 are actuated.

Figure 3:
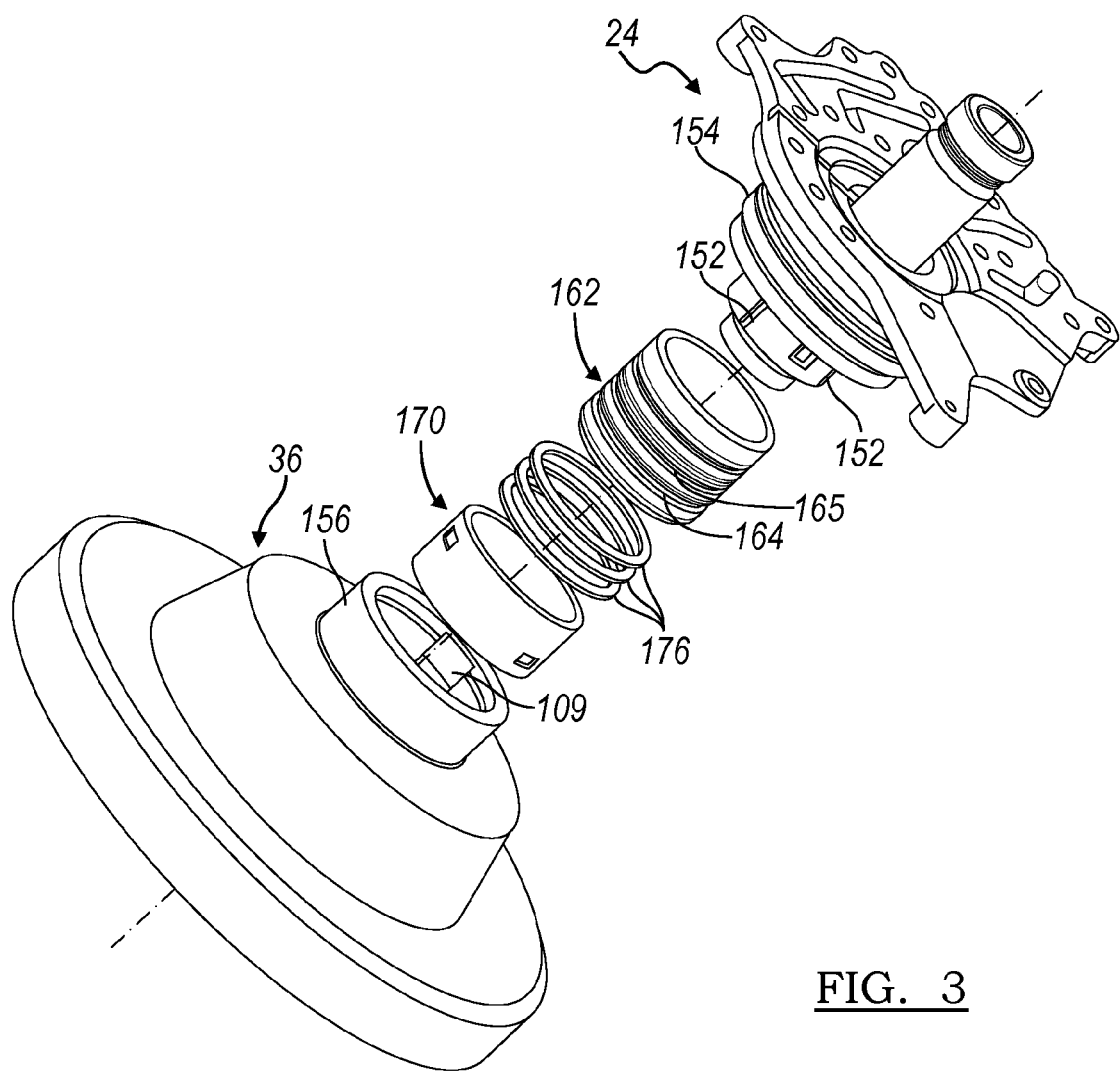
FIG. 3 is a side perspective view showing sleeves that are fitted on the front support and middle cylinder assembly, respectively.

Sleeves 162, 170 also provide access that enables machining of the first and second passages 152, 109 in the surface at the outside diameter of front support 24 and in the surface at the inside diameter of the front cylinder assembly 36. FIG. 3 shows sleeves 162, 170 and three seals 176, which are fitted in recesses on sleeve 162 between each of its radial passages 164, 165.

Figure 4:
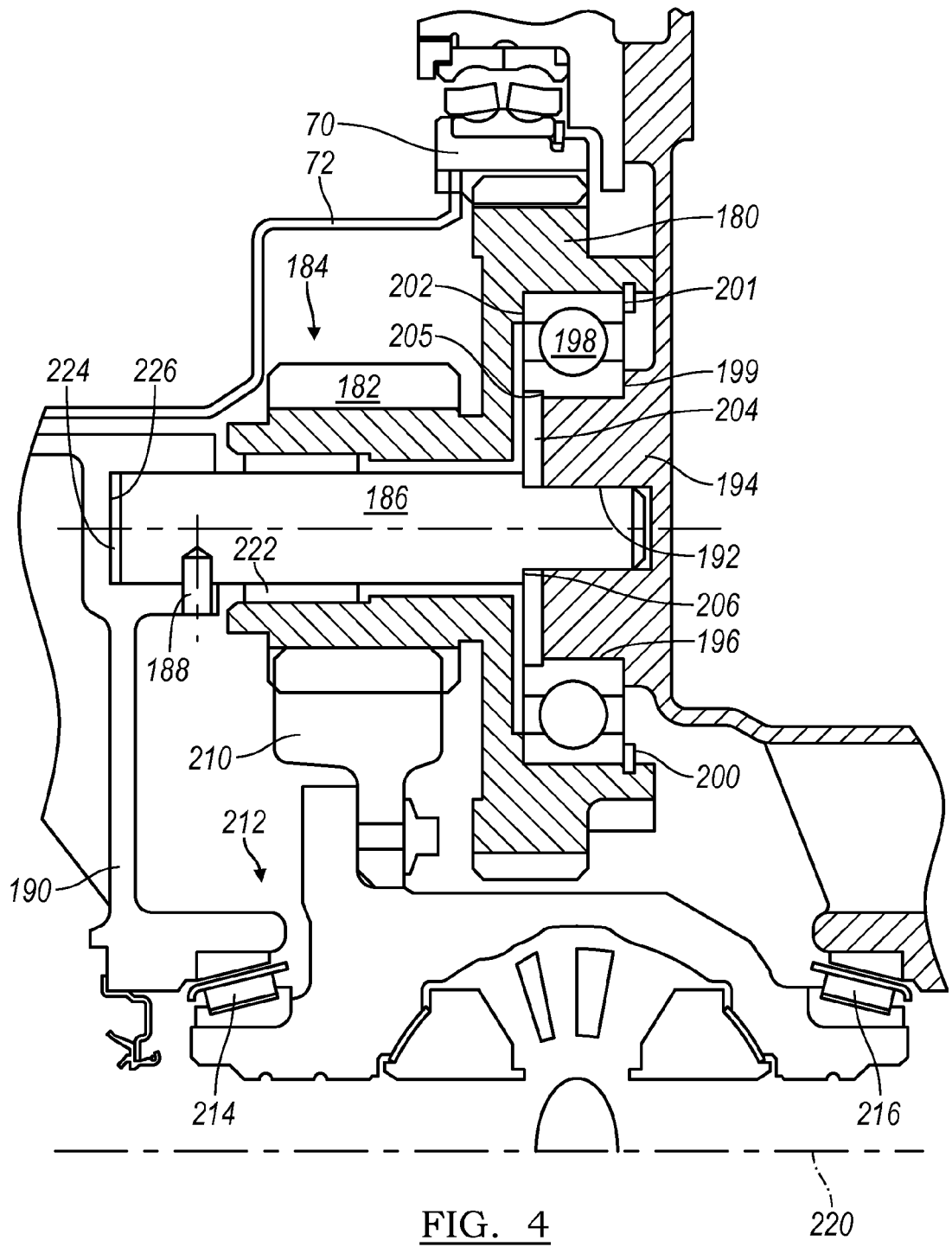
FIG. 4 is a cross sectional side view of the transfer gears and shaft near the output of the transaxle of FIG. 1.

As FIG. 4 shows output pinion 70 meshes with a transfer gear 180, which is formed integrally with transfer pinion 182 on a transfer wheel 184. A transfer shaft 186, is secured at one end by a pinned connection 188 to a non-rotating housing component 190, and at the opposite end is seated in a recess 192 formed in a non-rotating torque converter housing component 194. Ball bearing 198 supports transfer wheel 184 on the torque converter housing 194. Housing components 190, 194 comprise a reaction component and may be formed integrally or preferably as separate components.

Ball bearing 198 is supported radially by being seated on a surface 196 of the torque converter housing 194. A shoulder 199 on torque converter housing 194 contacts the right-hand axial surface of the inner race of bearing 198, the second surface of bearing 198. A snap ring 200 contacts the right-hand axial third surface 201 of the outer race of bearing 198. Shoulder 199 and snap ring 200 limit rightward axial movement of bearing 198.

A shoulder 202 formed on gear wheel 184 contacts the left-hand axial first surface of the outer race of bearing 198. A thrust washer 204 contacts a left-hand axial fourth surface 205 of the inner race of bearing 198. The thrust washer 204 contacts a shoulder 206 formed on transfer shaft 186. Shoulders 202 and 206 limit leftward axial movement of bearing 198

The ring gear 210 of a differential mechanism 212 meshes with transfer pinion 182 and is supported for rotation by bearings 214, 216 on housing 190, 194. Rotating power transmitted to output pinion 70 is transmitted through transfer gears 180, 182 and ring gear 210 to the input of differential, which drives a set of vehicle wheels aligned with axis 220.

A roller bearing 222 supports transfer wheel 184 on transfer shaft 186. The thickness of a washer 224, fitted in a recess 226 of housing 190, is selected to ensure contact between thrust washer 204 and the inner race of bearing 198.

The output pinion 70 and transfer gears 180, 182 have helical gear teeth, to which are applied thrust forces in the axial direction parallel to axis 220, and radial forces normal to the plane of FIG. 4. A thrust force in the right-hand direction transmitted to the transfer gear wheel 184 is reacted by the torque converter housing 194 due to its contact at shoulder 199 with bearing 198. A thrust force in the left-hand direction transmitted to the transfer gear wheel 184 is reacted by the housing 190 due to contact between snap ring 200 and bearing 198, contact between bearing 198 and thrust washer 204, contact between the thrust washer and transfer shaft 186, and contact between shaft 186, washer 224 and housing 190.

Figure 5:
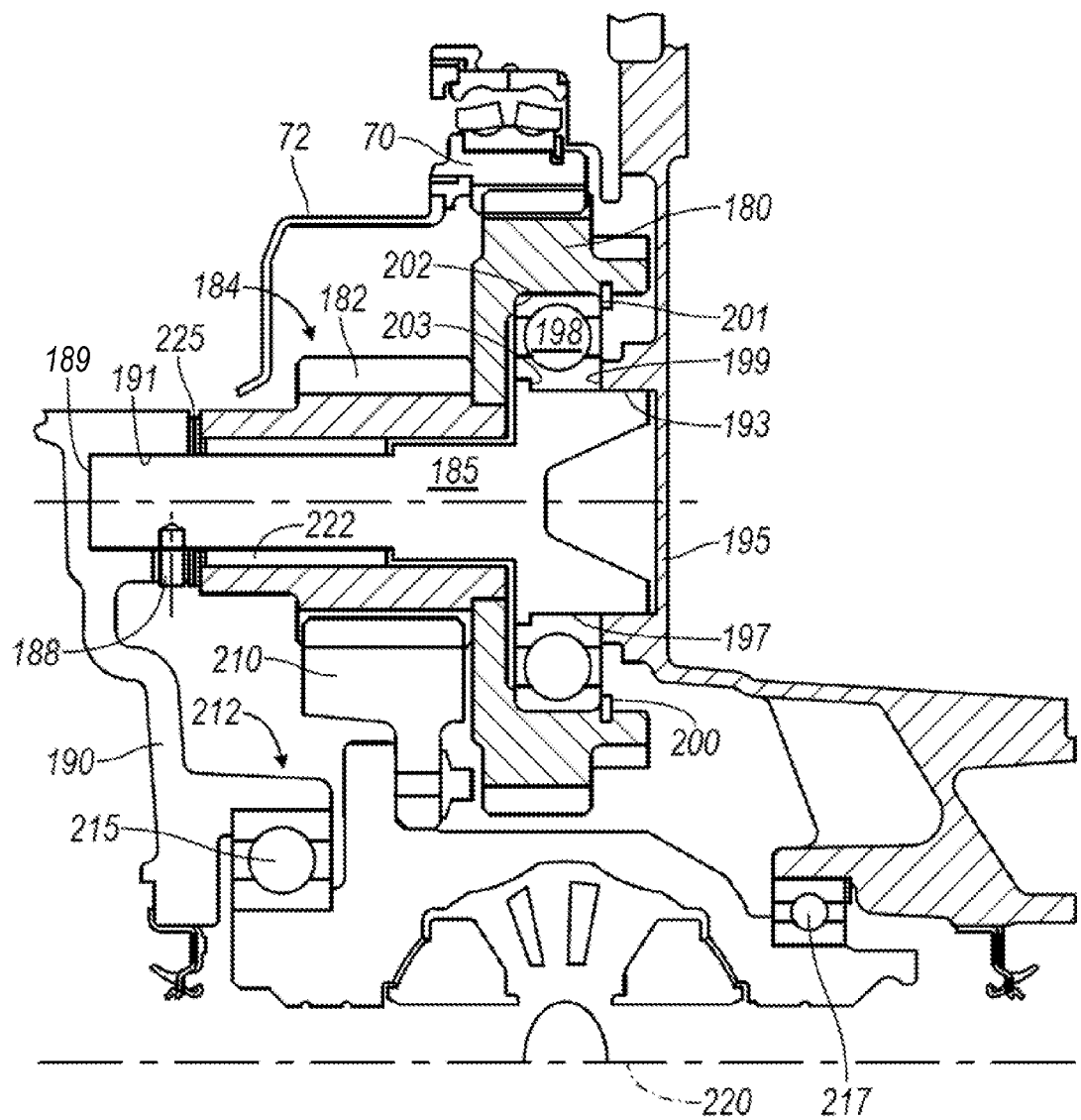
FIG. 5 is a cross sectional side view of another embodiment showing the transfer gears and transfer shaft.

Referring now to FIG. 5, output pinion 70 meshes with a transfer gear 180, which is formed integrally or secured mutually by welding with transfer pinion 182, the gear 180 and pinion 182 forming a transfer gear wheel 184. A transfer shaft 185 is secured at one end by a pinned connection 188 to a non-rotating housing component 190. The left-hand end of shaft 185 either contacts the bottom surface of a bore 191 formed in component 190 or it contacts a shim 189 located at the base of the bore 191, the shim being in contact with the bottom surface of the bore 191. The right-hand end of shaft 185 is spaced from the base of the bore 193 formed in a non-rotating torque converter housing component 195. Ball bearing 198 and roller bearing 222 support transfer wheel 184 on the transfer shaft 185.

Housing components 190, 195 comprise a reaction component and may be formed integrally or preferably as separate components.

The transfer shaft is formed with a shoulder 203 sized and located for contact with the inner race of bearing 198. A snap ring 200, seated in a recess formed in transfer gear 180, holds the outer race of bearing 198 in contact with the transfer gear wheel 184 and holds the inner race of bearing 198 in contact with the shoulder 203 of the transfer shaft 185.

A shoulder 199 on torque converter housing 195 contacts the right-hand axial surface of the inner race of bearing 198, i.e., the first surface of bearing 198. Snap ring 200 contacts the right-hand axial surface 201 of the outer race of bearing 198, i.e., the second surface of bearing 198. A shoulder 202 formed on gear wheel 184 contacts the left-hand axial surface of the outer race of bearing 198, i.e., the third surface of bearing 198. Shoulder 203 formed on transfer shaft 185 contacts an axial surface of the inner race of bearing 198, i.e., the fourth surface of bearing 198. Shoulder 199 and snap ring 200 limit rightward axial movement of bearing 198. Shoulders 202, 203 limit leftward axial movement of bearing 198.

The ring gear 210 of a differential mechanism 212 meshes with transfer pinion 182 and is supported for rotation by bearings 215, 217 on components 190, 194. Rotating power transmitted to output pinion 70 is transmitted through transfer gear 180, pinion 182 and ring gear 210 to the input of differential 212, which drives a set of vehicle wheels aligned with axis 220.

The washers 225, which are located adjacent component 190 and are spaced from the axial end of transfer gear wheel 184, retain roller bearing 222 in position on the transfer shaft 185.

The output pinion 70 and transfer gears 180, 182 have helical gear teeth. Thrust force components are applied to the teeth of the gear wheel 184 in both axial directions substantially parallel to axis 220 as torque is transmitted between the transmission output pinion 70 and the ring gear 210 of the differential 212. Radial force components also are applied to the teeth of the gear wheel 184 in both radial directions substantially normal to the plane of FIG. 5 as gear wheel 184 transmits torque.

A thrust force in the right-hand direction transmitted to the transfer gear wheel 184 is applied by shoulder 202 to the third surface of bearing 198 and is reacted by component 195 due to its contact at shoulder 199 with first surface on the inner race of bearing 198.

A thrust force in the left-hand direction transmitted to the transfer gear wheel 184 is applied by snap ring 200 to the second surface on the outer race of bearing 198. That thrust force is applied to shoulder 203 of shaft 185 by the fourth surface on the inner race of bearing 198. That thrust force is reacted at housing component 190 due to contact between the left-hand end of shaft 185 and the base of bore 191 or the shim 189 that is located in the bore 191. Preferably, pin 188 transmits none of the leftward thrust force to component 190.

In accordance with the provisions of the patent statutes, the preferred embodiment has been described. However, it should be noted that the alternate embodiments can be practiced otherwise than as specifically illustrated and described.

The invention claimed is:

1. A drive assembly for a vehicle, comprising:
   a shaft supported in bores on first and second components;
   a helical gear wheel; and
   a ball bearing supporting the gear wheel on the shaft, transmitting axial force in a first axial direction between the gear wheel and the first component independently of the shaft, and transmitting axial force in a second axial direction via the shaft between the gear wheel and the bore of the second component.

2. The assembly of claim 1, wherein the ball bearing includes:
   a first race contacting the gear wheel;
   a second race contacting the first component; and
   a series of balls engaged with the first and second races.

3. The assembly of claim 1, wherein the ball bearing includes:
an outer race;
an inner race;
a series of balls engaged with the first and second races;
a first surface on the inner race contacting the first component;
a second surface on the outer race contacting a snap ring secured to the gear wheel;
a third surface on the outer race contacting the gear wheel; and
a fourth surface on the inner race contacting the shaft.

4. The assembly of claim 1, wherein:
the first and the second components are fixed against rotation; and
the shaft is secured to one of the first and second components against rotation and transmits axial force to the second component.

5. The assembly of claim 1, wherein:
the gear wheel is formed with first and second sets of gear teeth, the first set of teeth engaged with a transmission output, the second set of teeth engaged with a ring gear of a differential mechanism.

6. A drive assembly for a vehicle, comprising:
a shaft supported in bores on first and second components;
a gear; and
a bearing supporting the gear on the shaft, the bearing including a first surface where axial force is transmitted in a first direction between the bearing and the first component, a second surface where axial force is transmitted in a second direction between the gear and the bearing, the second component reacting axial force carried by along the shaft to a shim located at a base of the bore of the second component.

7. The assembly of claim 6, wherein:
the first surface is on an inner race of the bearing; and
the second surface is on an outer race of the bearing.

8. The assembly of claim 7, wherein the bearing further includes:
a third surface on an outer race of the bearing and contacting the gear wheel; and
a fourth surface on an inner race of the bearing and contacting the shaft.

9. The assembly of claim 6, wherein:
the gear wheel is formed with first and second sets of gear teeth, the first set of teeth engaged with a transmission output, the second set of teeth engaged with a ring gear of a differential mechanism.

10. The assembly of claim 6, wherein:
the first and the second components are held against rotation; and
the shaft is secured to one of the first and second components against rotation.

11. A drive assembly for a vehicle, comprising:
a non-rotating transfer shaft supported on first and second components;
a gear wheel;
a ball bearing supporting the gear wheel, transmitting axial force in a first axial direction between the gear wheel and the first component independently of the shaft, and transmitting axial force in a second axial direction via the shaft between the gear wheel and the second component.

12. The assembly of claim 11, wherein the bearing includes a first race contacting the gear wheel, a second race contacting the second component; and a series of balls engaged with the first and second races.

13. The assembly of claim 12, further comprising:
a roller bearing positioned on the shaft supporting the gear wheel;
a washer located adjacent the first component and spaced from an axial end of the gear wheel, for retaining the roller bearing on the shaft.

14. The assembly of claim 11, wherein the bearing includes:
an outer race;
an inner race;
a series of balls engaged with the first and second races;
a first surface on the inner race contacting the first component;
a second surface on the outer race contacting a snap ring secured to the gear wheel;
a third surface on the outer race contacting the gear wheel; and
a fourth surface on the inner race contacting the shaft.

15. The assembly of claim 11, wherein:
the components are secured against axial displacement; and
the shaft is secured to one of the first and the second components against rotation.

16. The assembly of claim 11, wherein the gear wheel is formed with helical gear teeth.

17. The assembly of claim 11, further comprising a snap ring secured to the gear wheel, contacting the bearing and limiting axial displacement of the bearing relative to the gear wheel.

18. The assembly of claim 11, wherein:
the gear wheel is formed with first and second sets of gear teeth, the first set of teeth engaged with a transmission output, the second set of teeth engaged with a ring gear of a differential mechanism.

19. The assembly of claim 11, wherein the shaft is formed with a shoulder that contacts the bearing and limits axial displacement of the bearing.

* * * * *